(12) United States Patent
Arora

(10) Patent No.: US 6,219,781 B1
(45) Date of Patent: Apr. 17, 2001

(54) METHOD AND APPARATUS FOR PERFORMING REGISTER HAZARD DETECTION

(75) Inventor: Judge K. Arora, Cupertino, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/223,240

(22) Filed: Dec. 30, 1998

(51) Int. Cl.[7] ........................................ G06F 9/38
(52) U.S. Cl. ................................................ 712/217
(58) Field of Search .................................. 712/216, 217

(56) References Cited

U.S. PATENT DOCUMENTS

| | | | |
|---|---|---|---|
| 5,838,961 | * 11/1998 | Smith | 712/233 |
| 5,941,983 | * 8/1999 | Gupta et al. | 712/216 |
| 5,948,095 | * 9/1999 | Arora et al. | 712/200 |
| 6,006,325 | * 12/1999 | Burger et al. | 712/216 |
| 6,035,389 | * 3/2000 | Grochowski et al. | 712/216 |

* cited by examiner

Primary Examiner—William M. Treat
(74) Attorney, Agent, or Firm—David J. Kaplan

(57) ABSTRACT

Performing hazard detection in the presence of predication. The status of a consumer register associated with a consumer instruction is determined. The status and value of a predicate associated with the consumer instruction is also determined. A hazard signal is then sent based the status of the consumer register, the status of the predicate, and the value of the predicate.

26 Claims, 4 Drawing Sheets

METHOD AND APPARATUS FOR PERFORMING REGISTER HAZARD DETECTION

The present invention relates to computer systems and more particularly to detecting register hazards in the presence of predication.

BACKGROUND

Computer systems, from small handheld electronic devices to medium-sized mobile and desktop systems to large servers and workstations, are becoming increasingly pervasive in our society. Computer systems typically include one or more processors. A processor manipulates and controls the flow of data in a computer by executing instructions. Increasing the speed at which instructions are executed tends to increase the computational power of the computer. Processor designers employ many different techniques to increase processor speed to create more powerful computers for consumers. One such technique is to implement a pipeline in a processor.

A pipeline is an assembly line for instructions. When an instruction is issued to a processor pipeline, the instruction is progressively processed through separate stages in the pipeline. At any given moment, the pipeline may contain many instructions, each at different stages of processing at different stages in the pipeline. In this manner, processor resources are better utilized, thereby increasing instruction execution throughput by the processor.

The execution of one instruction in a pipeline may depend on the execution of one or more previously issued instructions. If data from a first instruction in a pipeline is needed by a second instruction in the pipeline, then the unavailability of the data from the first instruction causes a delay in the execution of the second instruction. In such a case, a portion of the pipeline may need special processing, such as being halted, or stalled, until the first instruction completes execution so the resulting data can be used by the second instruction. This condition is called a hazard.

For example, consider the following set of instructions:

load X→R1 add R1+R2→R3

Proper execution of the add instruction depends on proper execution of the load instruction because the add instruction requires the data in register R1 as an operand, and the load instruction must first load this data into R1. Unfortunately, the result of the load instruction may not be ready by the time the add instruction is ready to use it. Consequently, execution of the add instruction must be delayed until the load instruction is completed. This is known as a read after write (RAW) hazard because the add instruction must read register R1 after the load instruction writes to register R1.

Now consider the following set of instructions:

load X→R1 add R2+R3→R1

Proper execution of the add instruction no longer depends on the load instruction because the target of the load instruction, R1, is not an operand of the add instruction. R1 is, however, the target of the add instruction, and subsequent instructions that read from register R1 expect R1 to contain the sum of R2+R3 rather than the data loaded by the load instruction. Unfortunately, the load instruction may take longer to execute than the add instruction. Consequently, execution of the add instruction may need to be delayed until the load instruction is completed so that the load instruction does not overwrite its return data in place of R2+R3 in register R1. This is known as a write after write (WAW) hazard because the add instruction must write to register R1 after the load instruction writes to R1.

SUMMARY OF THE INVENTION

A method and apparatus are described for performing hazard detection in the presence of predication. In accordance with one embodiment of the present invention, the status of a consumer register associated with a consumer instruction is determined. The status and value of a predicate associated with the consumer instruction is also determined. A hazard signal is then sent based the status of the consumer register, the status of the predicate, and the value of the predicate.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

In accordance with one embodiment of the present invention, a hazard detection circuit includes a register status logic block and a predicate logic block. The register status logic block detects the occurrence of read after write (RAW) and write after write (WAW) register hazards based upon producer and consumer register information. The predicate logic block qualifies a hazard detected in the register status logic block for a particular consumer instruction by inhibiting the hazard when a predicate associated with the consumer instruction is ready and false. A hazard signal is sent when both a hazard is detected for a particular consumer instruction in the register status logic block, and the predicate logic block indicates that either the associated predicate is pending or is true.

The hazard signal may then be used to stall all or a portion of the processor pipeline until the hazard is resolved. In this manner, hazards associated with predicated consumer or producer instructions having false predicates do not cause a stall of the processor pipeline. As a result, the overall instruction throughput of the processor may increase, thereby increasing speed. A more detailed description of embodiments of the present invention, including various configurations and implementations, is provided below.

Figure 1A:
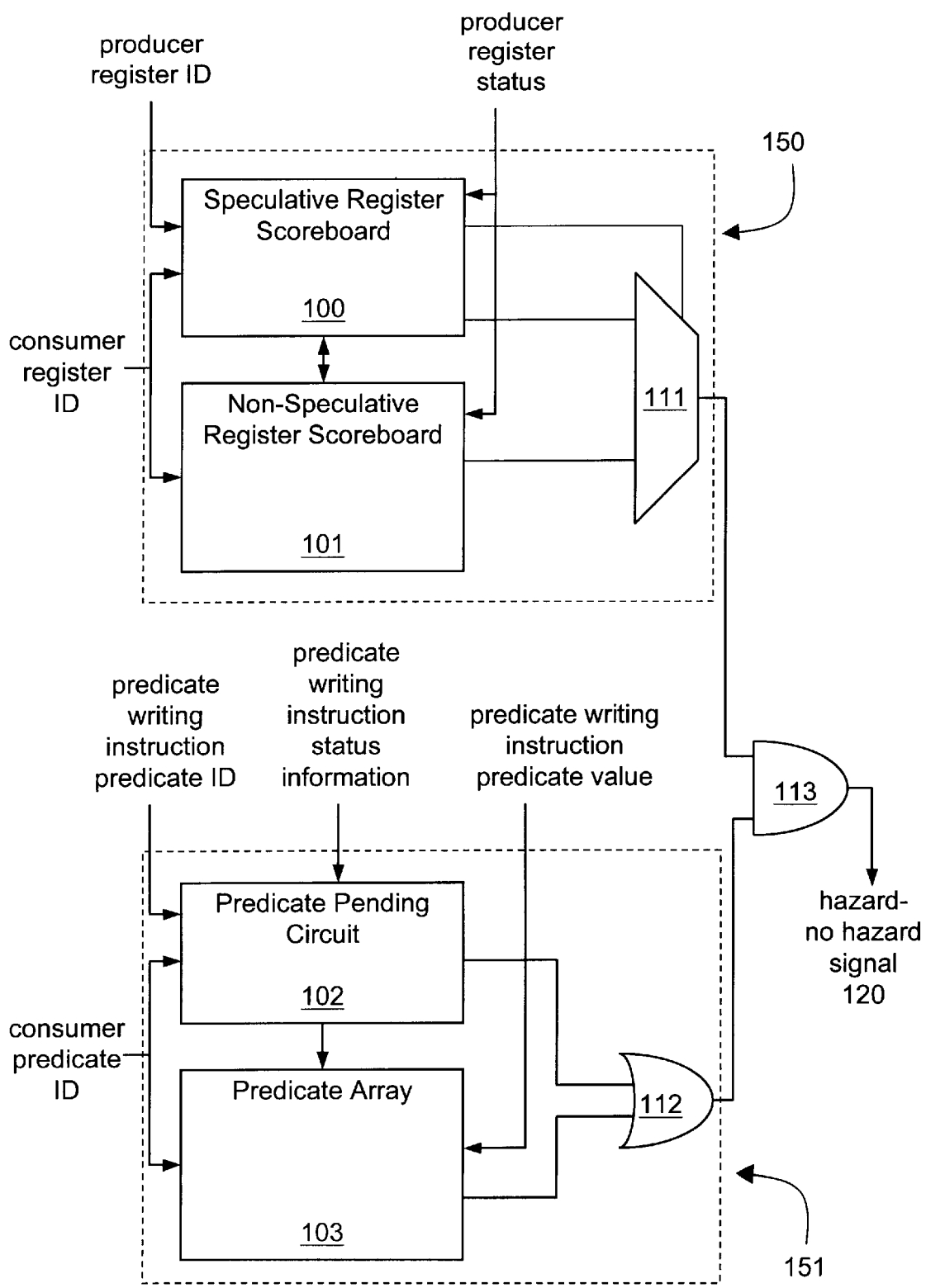
FIG. 1A is a circuit formed in accordance with an embodiment of the present invention.

FIG. 1A is a hazard detection circuit formed in accordance with an embodiment of the present invention. Register status logic block 150 of the circuit includes speculative register scoreboard 100 coupled to non-speculative register scoreboard 101. Predicate logic block 151 includes predicate pending circuit 102 coupled to predicate array 103. Speculative register scoreboard 100 receives input including consumer register ID, producer register ID, and producer register status. Non-speculative register scoreboard 101 receives input including a consumer register ID and a producer register status. A hit/miss output of speculative register scoreboard 100 is coupled to a control input of multiplexer 111. A status output of scoreboard 100 is coupled to an input of multiplexer 111. The other input of multiplexer 111 is coupled to a status output of non-speculative register scoreboard 101. The output of register status logic block 150 (which is the output of multiplexer 111 for the embodiment of FIG. 1A) is coupled to an input of AND gate 113.

Predicate pending circuit 102 of FIG. 1A receives input including consumer predicate ID and predicate writing instruction predicate ID and status information. Predicate array 103 receives input including consumer predicate ID and predicate writing instruction predicate value. A status output of predicate pending circuit 102 is coupled to an input of OR gate 112, and the other input of OR gate 112 is coupled to an output of predicate array 103. The output of predicate logic block 151 (which is the output of OR gate 112 for the embodiment of FIG. 1A) is coupled to the other input of AND gate 113. The output of AND gate 113 is hazard/no hazard signal line 120.

To explain the operation of the hazard detection circuit of FIG. 1A, consider the following set of instructions executed by the processor in accordance with one embodiment of the present invention:

load X→R1
compare R2=R3→P2
(P2) add R1+R4→R5

The nomenclature used herein will be defined in reference to these instructions. The load instruction is a producer instruction with respect to the add instruction. Register R1 is a producer register associated with the producer instruction. The status of register R1 is "pending" when the load instruction begins execution. The status of register R1 becomes "ready" when the data to be loaded into register R1 by the load instruction becomes available to subsequent consumers of R1.

Note that as used herein, the contents of a register of a register file (such as an integer, floating point, or general purpose register file) may be referred to as a register value or, simply, register. Similarly, the contents of a predicate register of a predicate register file may be referred to as a predicate value or, simply, predicate.

The compare instruction is a consumer of registers R2 and R3 and has an associated predicate P2. Based on the comparison of the values in registers R2 and R3, the value for compare instruction predicate P2 is determined. If the register value of R2 (i.e. the value stored in register R2) is equal to the register value of R3, then the value of predicate P2 is true, otherwise the predicate value is false. Note that other types of compare instructions or other instructions may be used to determine a predicate value. For example, a compare instruction may set the value of a predicate based on one register value being greater than or less than another register value. Other instructions may write values directly into predicate registers. As used herein, an instruction that determines (or writes to) a predicate is referred to as a predicate writing instruction.

The add instruction is a consumer of registers R1, R4, and R5. Note that an instruction may be a consumer instruction with respect to a previously issued producer instruction, and a producer instruction with respect to a subsequently issued consumer instruction. For example, although the add instruction is a consumer of registers R1, R4, and R5, the add instruction may also be a producer instruction of register R5 with respect to a subsequent instruction (not shown) that consumes (reads) the value of R5. Similarly, the load instruction is a producer of register R1 with respect to the add instruction, but is also a consumer instruction of register R1 with respect to a previous instruction (not shown) that produces (writes) to R1. In general, an instruction that reads from a register is a consumer of that register. An instruction that writes to a register is a consumer of that register with respect to previous instructions and a producer of that register with respect to subsequent instructions.

P2 is the predicate of the add instruction. Predicate P2 predicates the execution of the add instruction on the value of P2. For example, if the value of P2 is false, the add instruction is not executed. If P2 is true, the instruction is executed. As stated above, the value of predicate P2 is determined by the compare instruction. The status of predicate P2 becomes "pending" when the compare instruction begins execution. The status of P2 becomes "ready" when the predicate value, based on the result of the compare instruction, becomes available to subsequent instructions.

In accordance with one embodiment of the present invention, predicate status is represented in the hazard detection circuit of FIG. 1A as a single bit value for each predicate. For example, a predicate status of "1" indicates that the predicate is pending, and a predicate status of "0" indicates that the predicate is ready. Similarly, the value of each predicate may be represented by a single bit in which a value of "1" indicates a value of true, and a value of "0" indicates a value of false. In addition, the status of each register may be represented as a single bit for each register. For example, a status of "1" indicates that the register is pending, and a status of "0" indicates that the register is ready. For an alternate embodiment of the present invention, the value and status information may be represented by alternately defined bits.

Upon executing the load instruction, the register ID of producer register R1 is entered into speculative register scoreboard 100 of FIG. 1A along with its associated, initial, status of pending. Speculative register scoreboard 100 temporarily stores the register ID and status of producer registers (registers written to by producer instructions) until it is determined whether or not the producer instruction was properly executed. If it is determined that the producer register was properly executed, the speculative register status information stored in speculative register scoreboard 100 becomes non-speculative and is used to update the non-speculative register status information in non-speculative register scoreboard 101.

For example, assume the load instruction is executed speculatively after a branch prediction. Upon initial execution, the register ID of register R1 is entered into speculative register scoreboard 100 of FIG. 1A along with an associated status of pending. If the load instruction is issued before the branch prediction is verified, the producer register status update is provided to speculative register scoreboard 100, changing the speculative status of register R1 to ready. If the branch prediction is then determined to be correct, non-speculative register scoreboard 101 is updated with the register status of ready.

If, instead, the branch prediction is verified to be correct before the load instruction completes execution, non-speculative register scoreboard 101 of FIG. 1A is updated with the register status of pending. Once the load instruction then completes execution, the producer register status update is provided to register scoreboard 101, changing the status of register R1 to ready.

Alternatively, if the branch prediction leading to the execution of the load instruction is determined to be incorrect, the register status and ID information stored in speculative register scoreboard 100 is cleared and is not used to update non-speculative register scoreboard 101. For one embodiment of the present invention, non-speculative register scoreboard 101 is used to update the information stored in speculative register scoreboard 100 upon a branch misprediction.

As used herein, completion of execution of the producer instruction does not necessarily mean that the new register value has been stored in the producer register. Instead, execution of a producer instruction may be deemed sufficiently "complete" when the producer register value becomes available to a subsequent consumer instruction. This may be before the new register value has been stored in the register (e.g., in a bypass architecture). This same discussion applies to the completion of a compare instruction with respect to the new predicate value.

Referring to the set of instructions described above, upon execution of the add instruction, the consumer register IDs of the add instruction are provided to register status logic block 150 of FIG. 1A. The consumer register IDs are used in speculative register scoreboard 100 to determine if any of the consumer register IDs match a previously stored producer register ID. If a match is found (i.e., a hit), the appropriate register status information stored in scoreboard 100 is provided to an input of multiplexer 111, and the hit/miss line selects this input as the multiplexer output.

In accordance with one embodiment of the present invention, speculative register scoreboard 100 of FIG. 1A comprises a series of comparators and latches. The latches store register ID and status information for producer registers at various clock stages. Comparators are used at different clock stages to compare the stored register ID to incoming consumer register IDs. If a match is found, the associated register status is provided to an input of multiplexer 111, and the hit/miss line selects this input as the multiplexer output.

Figure 1B:
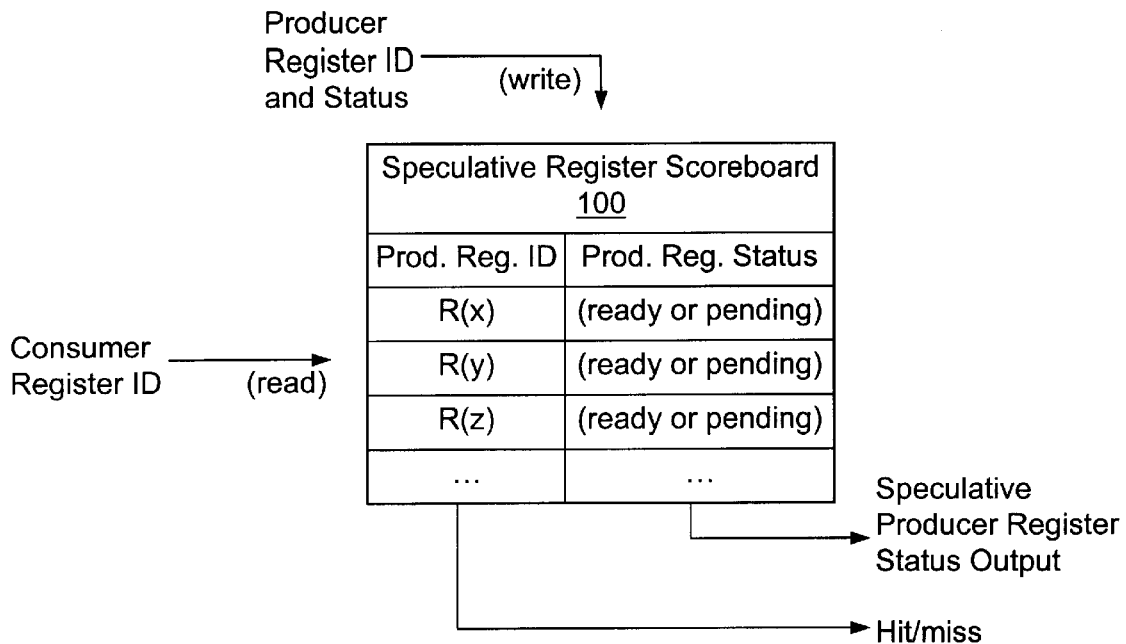
FIG. 1B shows addition detail of elements of the circuit if FIG. 1A in accordance with an embodiment of the present invention.

For an alternate embodiment of the present invention, speculative register scoreboard 100 may be implemented as a fully associative or set associative table that stores the producer register IDs of producer instructions in a first column and the producer register status of the producer instructions in a second column. This embodiment is shown in FIG. 1B. For this embodiment, the first column of the table is searched for a producer register ID that matches an incoming consumer register ID. If found, the associated register status is provided from the second column of the table to an input of multiplexer 111, and the hit/miss line selects this input as the multiplexer output. For another embodiment, speculative register scoreboard 100 may be implemented as a direct mapped table containing a column of register status bits, each register status bit being indexed by a register ID. For this embodiment, the register status bit associated with an incoming consumer register ID is looked up in the table and provided to a selected input of multiplexer 111.

The consumer register IDs of the add instruction are also used in non-speculative register scoreboard 101 of FIG. 1A to determine the non-speculative status of the registers. The non-speculative register status information stored in scoreboard 101 is provided to the other input of OR gate 111. If no match is found (i.e., a miss) for a particular consumer register ID in speculative register scoreboard 100, the hit/miss line from scoreboard 100 selects the status from non-speculative register scoreboard 101 as the output from multiplexer 111.

In accordance with one embodiment of the present invention, non-speculative register scoreboard 101 may be designed in a similar manner as described above for speculative scoreboard 100 of FIG. 1A. For example, for one embodiment, scoreboard 101 is implemented as a fully associative or set associative table. For an alternate embodiment, non-speculative register scoreboard 101 is implemented as a direct mapped table containing a column of register status bits, each register status bit being indexed by a register ID. For this embodiment, the register status bit associated with an incoming consumer register ID is looked up in the table and provided to an input of multiplexer 111. In accordance with one embodiment of the present invention, the register status table of non-speculative register scoreboard 101 accommodates all integer and floating point registers available to an application, each indexed by a unique register ID.

In accordance with an alternate embodiment of the present invention, scoreboards 100 and 101 are combined into a single table that stores both speculative and non-speculative register status information in separate columns. For another embodiment, a single table stores register status information for each register ID regardless of whether or not the information is speculative or non-speculative. This embodiment may be implemented in architectures that may or may not support branch prediction. For this embodiment in which branch prediction is supported, an alternate method is implemented to correct the register status information in the table after a branch misprediction.

Referring to the set of instructions provided above, execution of the load instruction causes the register ID for producer register R1 to be entered into speculative register scoreboard 100 of FIG. 1A along with its associated status of pending. Upon verification that the load instruction was correctly executed (e.g. there was no branch misprediction), the status information for register R1 is entered into non-speculative register scoreboard 101. When the load instruction returns the data (i.e. the data is received from memory for entry into the register), the status of register R1 is updated in either speculative register scoreboard 100 or non-speculative register scoreboard 101 to ready.

Execution of the add instruction causes the register ID for consumer register R1 to be entered into both speculative register scoreboard 100 and non-speculative register scoreboard 101 of FIG. 1A. The register ID for consumer register R1 is compared to the producer register IDs stored in speculative register scoreboard 100 to determine if there is a match. If a match is found, the associated speculative register status information for register R1 is provided to the output of register status logic block 150 via multipixer 111. The consumer register ID for register R1 is also used to perform a lookup in the register status table within non-speculative register scoreboard 101. If no match is found in speculative register scoreboard 100, the register status information for register R1 found in scoreboard 101 is provided to the output of register status logic block 150 via multiplexer 111.

If the status of register R1 is determined to be pending, then the output of register status logic block 150 indicates that a hazard has been detected. As will be described below, this detected hazard is qualified by predicate logic block 151 via AND gate 113 before a final hazard signal is sent via hazard/no hazard signal line 120. That is, predicate logic block 151 may inhibit hazard detection as determined by register status logic block 150 such that a no hazard signal is ultimately sent by the hazard detection circuit at the output of AND gate 113.

Figure 1C:
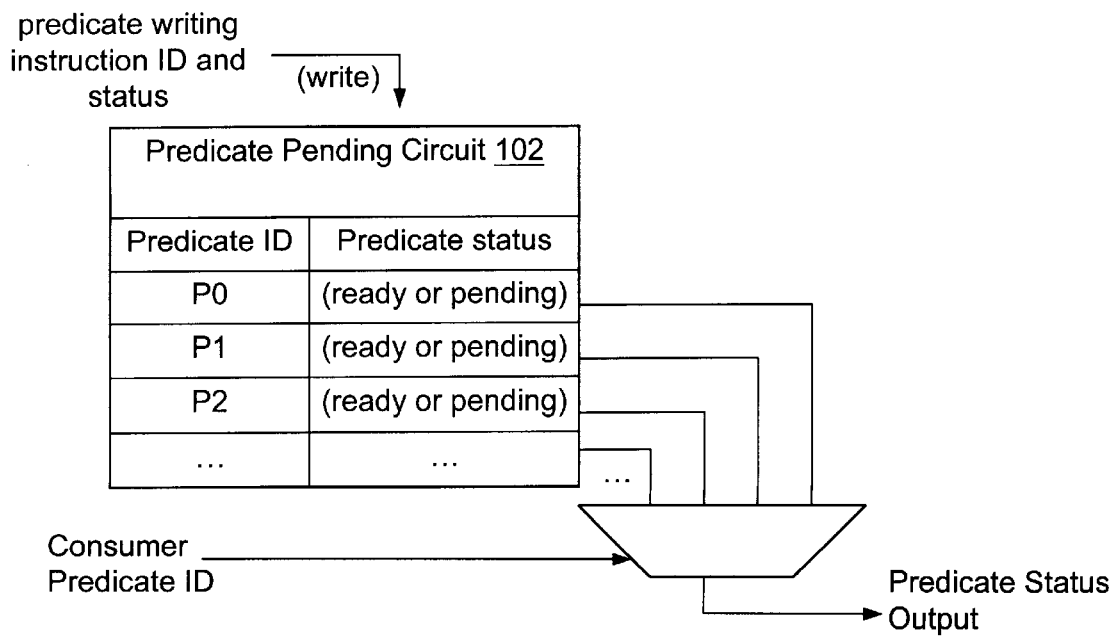
FIG. 1C shows addition detail of other elements of the circuit if FIG. 1A in accordance with an embodiment of the present invention.

Upon initial execution of the compare instruction, the predicate ID of predicate P2 is entered into predicate pending circuit 102 of FIG. 1A along with an initial status of pending. One embodiment of predicate pending circuit 102 is shown in FIG. 1C. Predicate pending circuit 102 temporarily stores the predicate ID and status of predicates until the predicate writing instruction has completed execution and the value of the predicate (e.g., the compare instruction result) becomes available to subsequent instructions. The predicate ID and predicate value are then passed to predicate array 103 for entry into the predicate array. For an alternate embodiment of the present invention, it may be assumed that any predicate ID stored in predicate pending circuit 102 has a status of pending, even without a status bit being specifically stored in the predicate pending circuit. For this embodiment, there may be no need to additionally store the predicate status associated with a particular predicate ID. In accordance with this embodiment, if the predicate ID is stored in predicate pending circuit 102, the predicate status is pending. Otherwise, the predicate status is ready.

For example, referring to the set of instructions discussed above, assume that the value stored in register R2 is equal to the value stored in register R3. Upon execution of the compare instruction, the predicate ID for P2 is entered into predicate pending circuit 102 of FIG. 1A. When the compare instruction completes execution, the result of true is returned to predicate array 103 at the location indexed by the P2 predicate ID, and the predicate ID for P2 is removed from predicate pending circuit 102.

For this example, because the value of predicate P2 is true, the subsequent add instruction is executed. As described above, the consumer register IDs of the add instruction are provided to register status logic block 150 of FIG. 1A for qualified hazard detection. In addition, the consumer predicate ID for P2 is provided to predicate logic block 151 to qualify the hazard detection.

Upon receiving the P2 predicate ID, predicate pending circuit 102 determines if the P2 predicate ID matches any pending predicate IDs stored within. If the compare instruction has not completed by the time the add instruction is executed, then predicate pending circuit 102 finds a match between the P2 consumer predicate ID associated with the add instruction and the P2 compare instruction predicate ID. A status of pending is then sent to an input of OR gate 112. If, on the other hand, the compare instruction has completed by the time the add instruction is executed, then predicate pending circuit 102 finds no match for the P2 consumer predicate ID. A status of ready is then sent to an input of OR gate 112. In accordance with one embodiment of the present invention, predicate pending circuit 102 may have a structure similar to the structure described above for speculative register scoreboard 100. More specifically, predicate pending circuit 102 may be designed as a series of comparators and latches, a fully associative table, a set associative table, or a direct mapped table.

Upon receiving the predicate ID for P2, predicate array 103 determines the value of predicate P2. Predicate array 103 of FIG. 1A uses the incoming consumer predicate ID to lookup the stored value for predicate P2. If the compare instruction has completed by the time the add instruction is executed, then predicate array 103 provides the value of true to the input of OR gate 112. For one embodiment of the present invention, the structure of predicate array 103 is similar to the structure described above for register scoreboard 101. For an alternate embodiment of the present invention, predicate pending circuit 102 and predicate array 103 are combined into a single table containing a column of predicate status information and a column of predicate value information indexed by predicate IDs.

For the example described above in which the value of register R2 is equal to the value of register R3, the output of OR gate 112 of FIG. 1A is a value that affirms the hazard detection result from register status logic block 150. The outputs of register status logic block 150 and predicate logic block 151 are provided to the inputs of AND gate 113, and a hazard signal is sent until the load instruction completes execution.

Conversely, for an embodiment in which the value of register R2 is not equal to the value of register R3, a result of false is returned to predicate pending circuit 102 of FIG. 1A when the compare instruction completes execution. This predicate value is then entered into predicate array 103 at the location indexed by the P2 predicate ID, and the predicate ID for P2 is removed from predicate pending circuit 102.

For this embodiment, when the consumer predicate ID for P2 is received upon execution of the add instruction, predicate pending circuit 102 determines if the P2 predicate ID matches any pending predicate IDs stored within. If the compare instruction has not completed by the time the add instruction is executed, then predicate pending circuit 102 finds a match between the P2 consumer predicate ID associated with the add instruction and the P2 compare instruction predicate ID. A status of pending is then sent to an input of OR gate 112. If, on the other hand, the compare instruction has completed by the time the add instruction is executed, then predicate pending circuit 102 finds no match for the P2 consumer predicate ID. A status of ready is then sent from the predicate pending circuit to an input of OR gate 112, and the predicate value of false, located in predicate array 103, is sent to the other input of OR gate 112.

For this example, the output of predicate logic block 151 of FIG. 1A is a value that inhibits the qualified hazard detection result from register status logic block 150. This output is provided to an input of AND gate 113, and a no hazard signal is sent at its output.

Figure 2:
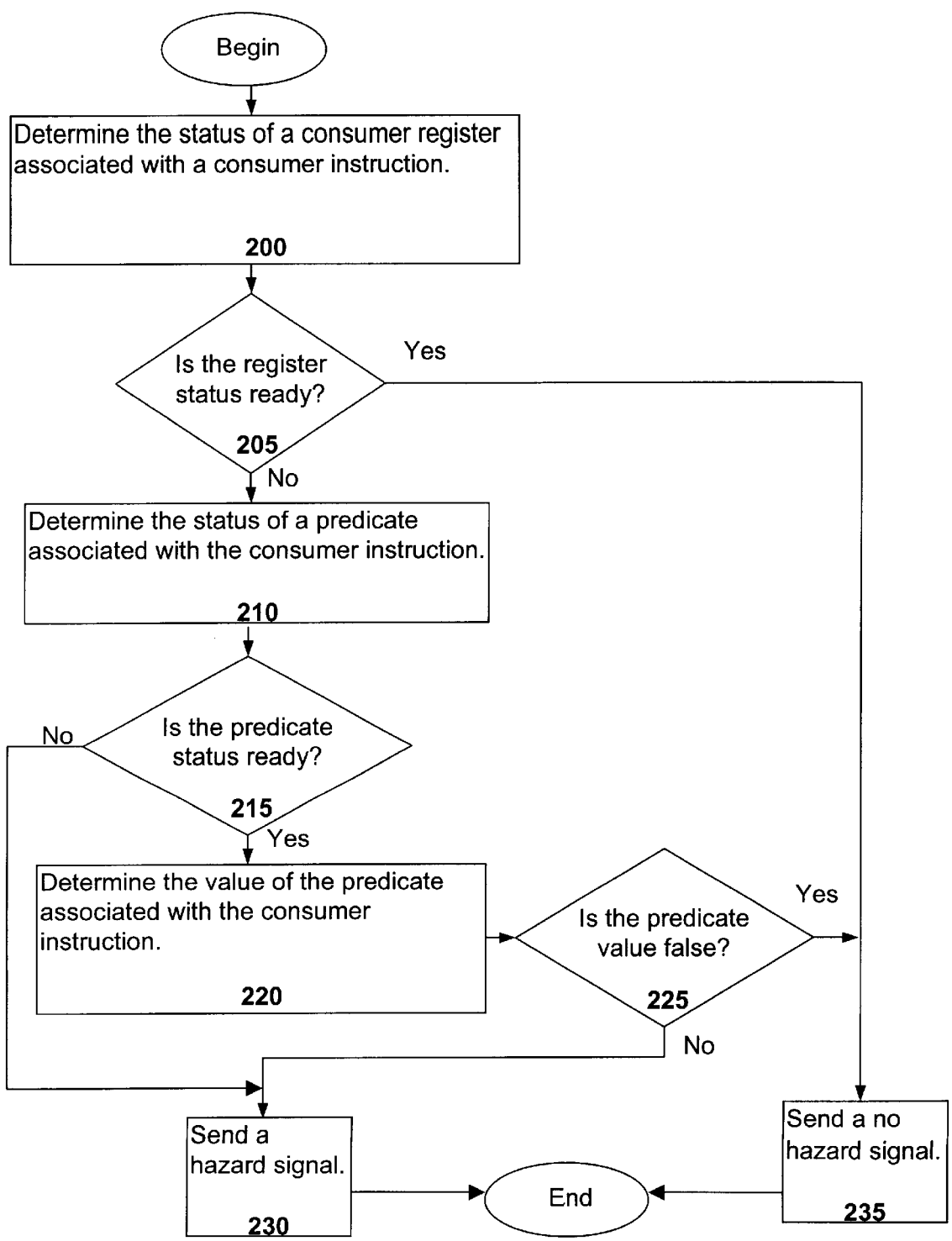
FIG. 2 is a flow chart showing a method of the present invention.

FIG. 2 is a flow chart showing a method of the present invention. At step 200 the status of a consumer register associated with a consumer instruction is determined. For one embodiment of the present invention, this status is determined in a register status logic block by searching speculative and non-speculative register scoreboards for producer register IDs that match the consumer register ID associated with the consumer instruction. If a match is found in the speculative register scoreboard, the associated register status stored in the speculative register scoreboard, either ready or pending, is used. If a match is not found in the speculative register scoreboard, the register status stored in the non-speculative register scoreboard is used.

At step 205 of FIG. 2, a decision is made regarding the status of the consumer register determined at step 200. According to step 205, if the status of the consumer register is ready, then the process flow proceeds to step 235. At step 235, a no hazard signal is sent. In accordance with one embodiment of the present invention, this no hazard signal is sent from the hazard detection circuitry to pipeline control circuitry in the processor, allowing instruction flow through the pipeline to proceed normally. If, on the other hand, the status of the consumer register is not ready (i.e., it is pending), process flow proceeds from step 205 to step 210.

At step 210 of FIG. 2, the status of the predicate associated with the consumer instruction is determined to be either ready or pending. For one embodiment of the present invention, this consumer predicate status is determined in a predicate logic block by determining if the consumer predicate ID matches a compare instruction predicate ID stored in a predicate pending circuit.

Next, at step 215 of FIG. 2, a decision is made regarding the predicate status. According to step 215, if the status of the consumer predicate is not ready (i.e., pending), then the process flow proceeds to step 230. At step 230, a hazard signal is sent. In accordance with one embodiment of the present invention, this hazard signal is sent from the hazard detection circuit to pipeline control circuitry in the processor. In response to receiving the hazard signal, the pipeline control circuitry stalls all or at least a portion of the processor pipeline until the hazard is removed. Alternatively, or in addition, the pipeline control circuitry may flush and replay instructions in the pipeline in response to receiving the hazard signal. If, on the other hand, the status of the predicate is ready, process flow proceeds from step 215 to step 220.

At step 220 of FIG. 2, the value of the consumer predicate is determined to be either true or false. For one embodiment of the present invention, this predicate value is determined in a predicate logic block by looking up the consumer predicate ID in a predicate array and using the value stored therein.

Next, at step 225 of FIG. 2, a decision is made regarding the predicate value. According to step 225, if the value of the consumer predicate is false, then process flow proceeds to step 235 where a no hazard signal is sent. If, instead, the value of the consumer predicate is not false (i.e., the value is true), then process flow proceeds to step 230 where a hazard signal is sent.

Figure 3:
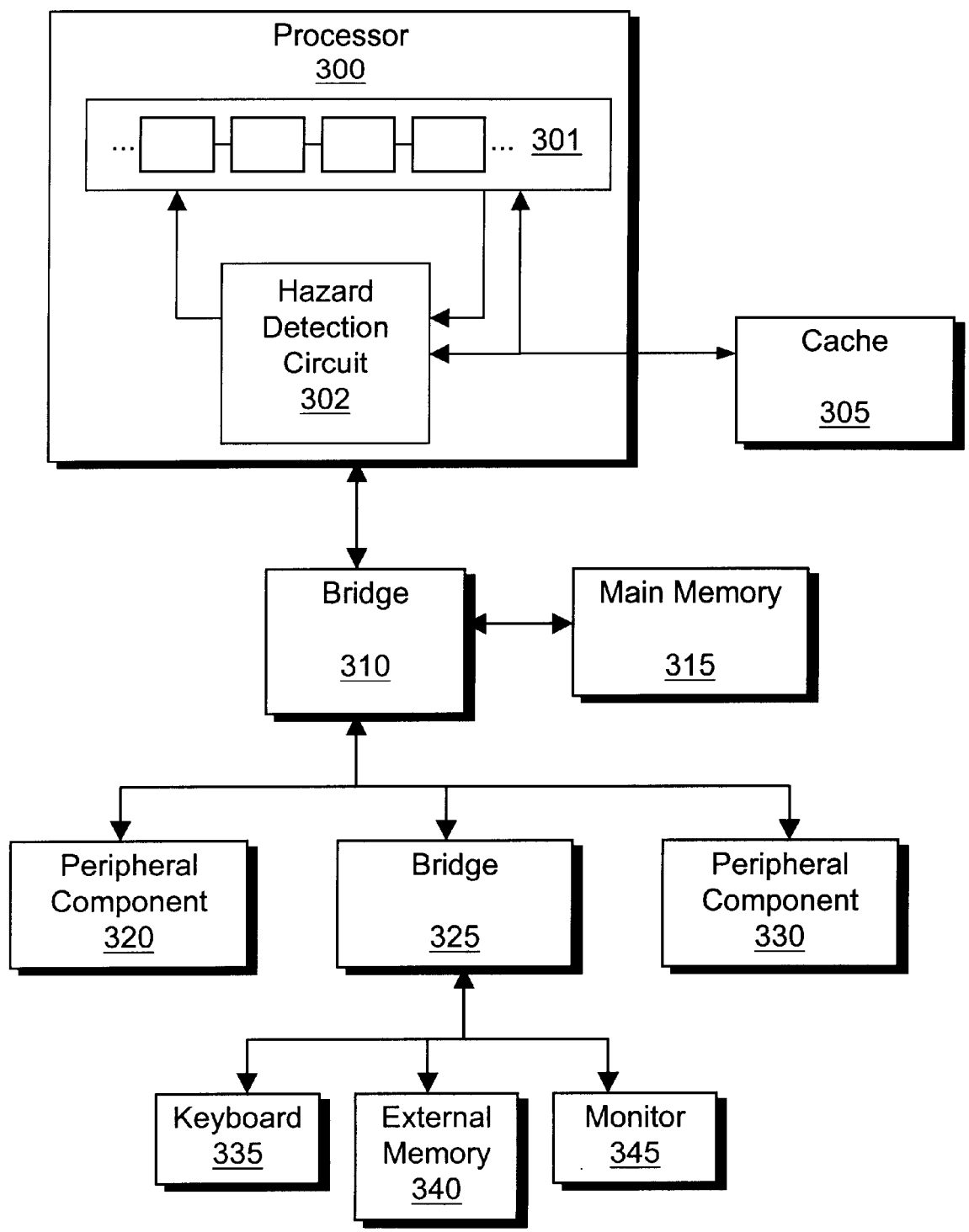
FIG. 3 is a computer system formed in accordance with an embodiment of the present invention.

FIG. 3 is a computer system formed in accordance with an embodiment of the present invention. Processor 300 includes pipeline 301 coupled to hazard detection circuit 302. Cache 305 and bridge 310 are coupled to processor 300. Bridge 310 is used to couple processor 300 to main memory 315 and to peripheral components 320 and 330. Bridge 325 couples keyboard 335, external memory 340, and monitor 345 to bridge 310.

Peripheral components 320 and 330 of FIG. 3 may include audio and video input/output devices such as audio/video generators, accelerators, or analyzers. External memory 340 may include a hard drive, floppy disk, tape drive, other magnetic storage media, a battery powered random access memory (RAM) device, an electrically programmable read only memory (EPROM) storage device, other solid-state storage device, a CD-ROM, or other non-volatile, machine-readable, storage medium.

Data stored in cache 305 originates in peripheral components 320 or 330, external memory 340, or is input by a user via keyboard 335. Before reaching cache 305, the data is initially transferred to main memory 315 via bridge 310. This data is then transferred to cache 305 via processor 300. During the transfer process, mathematical or logical operations may be performed on the data by processor 300 in response to the execution of instructions issued to pipeline 301. For one embodiment of the present invention, hazard detection circuit 302 is designed in accordance with the hazard detection circuit of FIG. 1A, and operates in accordance with the process flow of FIG. 2.

For one embodiment of the present invention, the load instruction discussed above in conjunction with FIG. 1A loads data from cache 305 into register R1. Cache 305 provides this data to pipeline 301, whereupon a producer register status signal is provided to hazard detection circuit 302 to update the status of register R1 from pending to ready.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A method of hazard detection comprising:
   determining a consumer register status associated with a consumer instruction;
   determining a predicate status associated with the consumer instruction;
   determining a predicate value associated with the consumer instruction;
   and
   sending a hazard signal based on the consumer register status, the predicate status, and the predicate value.

2. The method of claim 1, further comprising sending a no hazard signal if the consumer register status is pending, the predicate status is ready, and the predicate value is false.

3. The method of claim 2, wherein the hazard signal is sent if the consumer register status is pending and either the predicate status is pending or the predicate value is true.

4. The method of claim 1, wherein the hazard signal is sent if the consumer register status is pending and either the predicate status is pending or the predicate value is true.

5. The method of claim 4, further comprising stalling at least a portion of a processor pipeline in response to sending the hazard signal.

6. The method of claim 4, further comprising flushing instructions from at least a portion of a processor pipeline in response to sending the hazard signal.

7. The method of claim 1, wherein determining a consumer register status includes comparing a consumer register ID associated with the consumer instruction to a producer register ID stored in a speculative register scoreboard that stores speculative register status information.

8. The method of claim 1, wherein determining a consumer register status includes performing a lookup of a consumer register ID associated with the consumer instruction in a non-speculative register scoreboard that stores register status information.

9. The method of claim 1, wherein determining a predicate status includes comparing a consumer predicate ID associated with the consumer instruction to a predicate writing instruction predicate ID stored in a predicate pending circuit.

10. The method of claim 1, wherein determining a predicate value includes performing a lookup of a consumer predicate ID associated with the consumer instruction in a predicate array that stores predicate information.

11. A method of hazard detection comprising:
    maintaining a register status logic block that stores producer register status information associated with a producer instruction;
    maintaining a predicate logic block that stores predicate information associated with a predicate writing instruction;
    providing a consumer register ID associated with a consumer instruction to the register status logic block for qualified hazard detection; and
    providing a consumer predicate ID associated with the consumer instruction to the predicate logic block to qualify the hazard dectection.

12. The method of claim 11 wherein maintaining the register status logic block includes maintaining a speculative register scoreboard and a non-speculative register scoreboard, the speculative register scoreboard updating the non-speculative register scoreboard after the producer instruction becomes non-speculative.

13. The method of claim 12 wherein maintaining the register status logic block further includes the non-speculative register scoreboard updating the speculative register scoreboard after a branch misprediction.

14. The method of claim 11 wherein maintaining the predicate logic block includes storing both predicate value and predicate status information.

15. The method of claim 11, further comprising sending a no hazard signal if a hazard is indicated in the register status logic block and the predicate logic block indicates that the predicate that matches the predicate ID is ready and is false.

16. A processor comprising:
a register status logic block to store register status information;
a predicate logic block to store predicate status and predicate value information; and
a circuit coupled to the register status logic block and the predicate logic block, the circuit to send a hazard signal based on an indication from the register status logic block and an indication from the predicate logic block.

17. The processor of claim 16, wherein the circuit is to send a no hazard signal if the register status logic block indicates a hazard for a consumer register associated with a consumer instruction and the predicate logic block indicates a predicate status of ready and a predicate value of false for a predicate associated with the consumer instruction.

18. The processor of claim 17, wherein the circuit is to further send a no hazard signal if the register status logic block indicates no hazard for the consumer register.

19. The processor of claim 17, wherein the circuit is to further send a hazard signal if the register status logic block indicates a hazard for the consumer register and the predicate logic block indicates that either the predicate status is pending or the predicate value is true.

20. The processor of claim 16, wherein the register status logic block comprises a speculative register scoreboard to store speculative register status information, and a non-speculative register scoreboard to store non-speculative register status information.

21. The processor of claim 16, wherein the predicate logic block comprises a predicate pending circuit to store predicate status information, and a predicate array to store predicate value information.

22. A computer system comprising:
a memory to store a register value; and
a processor, coupled to the memory, comprising a pipeline, the pipeline to execute a consumer instruction that is a consumer of the register value, the consumer instruction being predicated on an associated predicate, at least a portion of the pipeline to be stalled until the register value has either been received from the memory or the predicate is determined to be both ready and false.

23. The system of claim 22, wherein the memory is a cache.

24. The system of claim 22, wherein the processor further includes speculative and non-speculative scoreboards to be updated after the register value is received from the memory in response to the execution of a load instruction.

25. The system of claim 22, wherein the processor further includes a predicate pending circuit that updates a status of the predicate upon execution of a predicate writing instruction.

26. The system of claim 25, wherein the processor further includes a predicate array that updates a value of the predicate upon receiving a result of the predicate writing instruction.

* * * * *

UNITED STATES PATENT AND TRADEMARK OFFICE
CERTIFICATE OF CORRECTION

PATENT NO. : 6,219,781 B1
DATED : April 17, 2001
INVENTOR(S) : Arora

Page 1 of 1

It is certified that error appears in the above-identified patent and that said Letters Patent is hereby corrected as shown below:

<u>Column 6,</u>
Line 54, delete "multipixer" insert -- multiplexer --.

Signed and Sealed this

Seventh Day of May, 2002

Attest:

JAMES E. ROGAN
*Attesting Officer*  *Director of the United States Patent and Trademark Office*